(12) United States Patent
Kameda (10) Patent No.: US 11,023,013 B2
(45) Date of Patent: Jun. 1, 2021

(54) COVER, METHOD OF PRODUCING THE SAME, AND METHOD OF PRODUCING IMAGING DEVICE INCLUDING THE SAME

(71) Applicant: SHARP KABUSHIKI KAISHA, Osaka (JP)

(72) Inventor: Takeshi Kameda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/785,952

(22) Filed: Feb. 10, 2020

(65) Prior Publication Data
US 2020/0257339 A1 Aug. 13, 2020

Related U.S. Application Data

(60) Provisional application No. 62/804,641, filed on Feb. 12, 2019.

(51) Int. Cl.
*G06F 1/16* (2006.01)
*G02F 1/1333* (2006.01)
*G02B 1/14* (2015.01)

(52) U.S. Cl.
CPC ............ *G06F 1/1656* (2013.01); *G02B 1/14* (2015.01); *G02F 1/133308* (2013.01); *G02F 1/133331* (2021.01); *G02F 2202/28* (2013.01)

(58) Field of Classification Search
CPC ....................................................... G06F 3/041
See application file for complete search history.

(56) References Cited

U.S. PATENT DOCUMENTS

2009/0185101 A1* 7/2009 Matsuhira ............. G02F 1/1339
349/58
2013/0271384 A1* 10/2013 Chuang ................. G06F 3/0445
345/173

FOREIGN PATENT DOCUMENTS

JP  4292130 B2  7/2009

* cited by examiner

*Primary Examiner* — Jerry Wu
(74) *Attorney, Agent, or Firm* — ScienBiziP, P.C.

(57) ABSTRACT

A cover comprising a cover panel having a flat plate shape and light transmissivity, an adhesive layer disposed on at least a portion of one surface of the cover panel, and a release sheet disposed on the adhesive tape so as to be releasable from the adhesive layer. The adhesive layer includes a hole extending through the adhesive layer in a thickness direction thereof, and the release sheet has light transmissivity and covers the hole.

2 Claims, 10 Drawing Sheets

COVER, METHOD OF PRODUCING THE SAME, AND METHOD OF PRODUCING IMAGING DEVICE INCLUDING THE SAME

CROSS REFERENCE TO RELATED APPLICATION

This application claims priority from U.S. Provisional Patent Application No. 62/804,641 filed on Feb. 12, 2019. The entire contents of the priority application are incorporated herein by reference.

TECHNICAL FIELD

The technology described herein relates to a cover, a method of producing the cover, and a method of producing an imaging device including the cover.

BACKGROUND ART

Electronic devices having an imaging function such as digital cameras, smartphones, and personal computers (hereinafter, referred to as imaging devices) include an imaging element such as a CCD element and a CMOS element that have a function of converting an optical image of a subject into electric signals. Such an imaging element is arranged in a cabinet of a product and configured to image a subject via a cover panel that has light transmissivity and closes an opening of the cabinet.

In producing an imaging device, the cover panel is provisionally mounted on the cabinet so as to be detachable therefrom to perform an imaging test and check whether the imaging device has imaging errors when performing an imaging operation via the cover panel. If it is confirmed that the imaging device has no imaging errors, the cover panel is regularly mounted on the cabinet.

Figure 10:
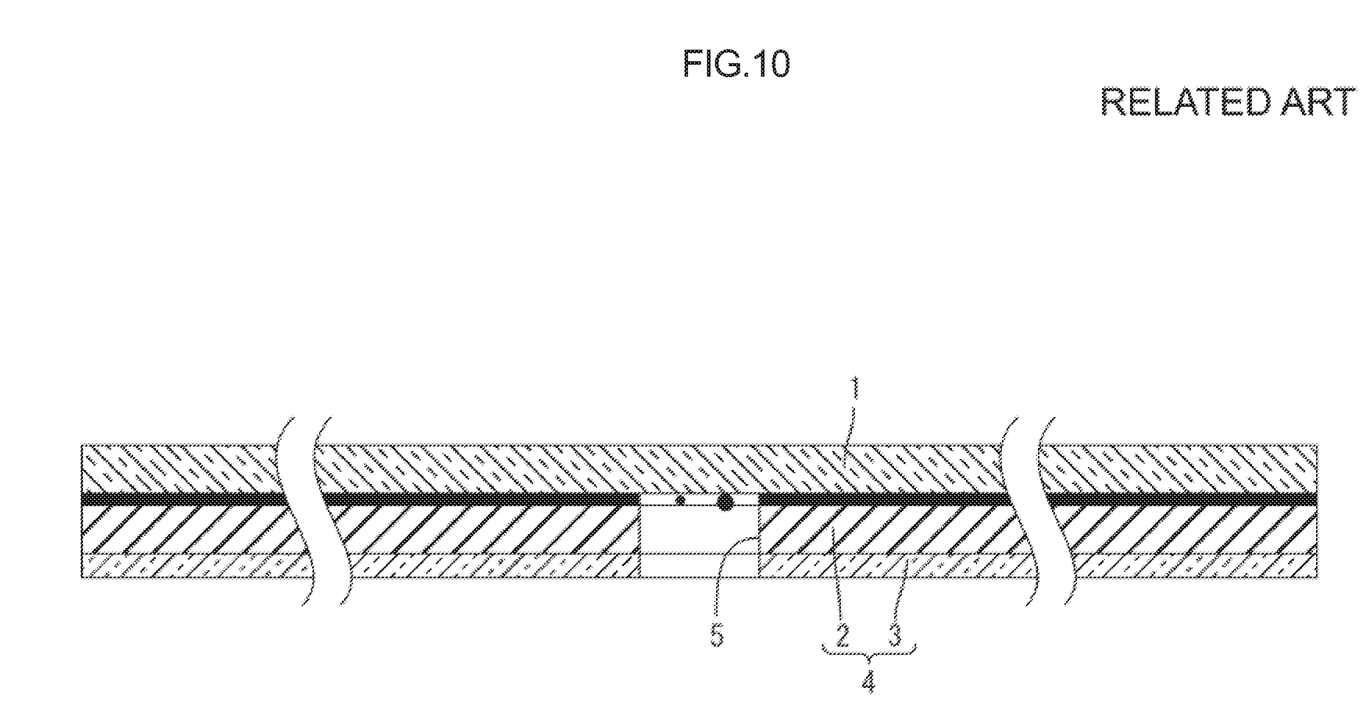
FIG. 10 is a cross-sectional view of a cover according to a related art.

More in detail, as illustrated in FIG. 10, a double-sided adhesive tape 4 including an adhesive layer 2 and a separator 3 is attached to a cover panel for bonding the cover panel to the cabinet. In the cover panel 1 that is mounted on the cabinet, the double-sided adhesive tape 4 includes a hole 5 in a portion overlapping an imaging element so as to extend through the adhesive layer 2 and the separator 3 and such that light can pass through the cover panel 1 to the imaging element in the cabinet. In a provisional mounting step, the cover panel 1 is mounted while including the separator 3. After the test, the separator 3 is removed in a regular mounting step and the cover panel 1 is fixed to the cabinet with the uncovered adhesive layer 2.

However, with the above configuration, before performing the regular mounting step on the cover panel 1, foreign obstacles such as dust may come into the hole 5 or dirt may adhere to an inside of the hole 5 during transportation or the provisional mounting step. Such foreign obstacles or dirt may degrade an imaging performance.

SUMMARY

The technology described herein was made in view of the above circumstances. An object is to provide a cover that causes less occurrence of entering of foreign obstacles such as dust into a hole or adherence of dirt during transportation or provisional mounting of a cover panel, a method of producing the cover, and a method of producing an imaging device including the cover.

A cover according to the technology described herein includes a cover panel having a flat plate shape and light transmissivity, an adhesive layer disposed on at least a portion of one surface of the cover panel, and a release sheet disposed on the adhesive tape so as to be releasable from the adhesive layer. The adhesive layer includes a hole extending through the adhesive layer in a thickness direction thereof and the release sheet has light transmissivity and covers the hole.

A method of producing the cover according to the technology described herein includes a double-sided adhesive member producing step of producing a double-sided adhesive member by performing following steps in sequence, the following steps including an adhesive layer forming step of forming the adhesive layer on one surface of a first sheet so as to be releasable from the first sheet, a hole forming step of forming a hole that extends through the adhesive layer and does not extend through the first sheet in a stacking direction of the first sheet and the adhesive layer, and a second sheet disposing step of disposing a second sheet on the adhesive layer so as to be releasable from the adhesive layer and cover the hole. One of the first sheet and the second sheet of the double-sided adhesive member has light transmissivity and has a release force for separating the one of the sheets from the adhesive layer relatively greater than another one of the sheets. The method further includes a separating step of separating one of the first sheet and the second sheet of the double-sided adhesive member having a lower release force from the adhesive layer after the double-sided adhesive member producing step, and an attaching step of attaching the adhesive layer that is uncovered to the cover panel having a flat plate shape and light transmissivity.

A method of producing an imaging device according to the technology described herein includes a provisional mounting step of provisionally mounting the cover according to any one of claims 1 to 4 in a casing through an opening thereof, the casing including an imaging section therein, the imaging section being configured to image a subject, and the casing having the opening on a surface opposite an imaging surface of the imaging section, the cover being mounted in a predetermined position in the casing such that the hole overlaps the imaging section, a testing step of testing an imaging condition of the imaging section, a separating step of separating the cover from the casing, and a regular mounting step of separating the release sheet from the adhesive layer and fixing the cover including the adhesive layer that is uncovered to the predetermined position of the casing.

According to the technology described herein, a cover that causes less occurrence of entering of foreign obstacles such as dust into a hole or adherence of dirt during transportation or provisional mounting of a cover panel, a method of producing the cover, and a method of producing an imaging device including the cover can be obtained.

DETAILED DESCRIPTION

One embodiment will be described with reference to FIGS. 1 to 9. In the section, a liquid crystal display device 10 (one example of an imaging device) having an imaging function and including a cover 20 will be described as an example. X-axis, Y-axis and Z-axis may be present in the drawings and each of the axial directions represents a direction represented in each drawing. A vertical direction is defined with reference to FIG. 2 and an upper side and a lower side in FIG. 2 correspond to a front side and a back side or a rear surface side, respectively.

Figure 1:
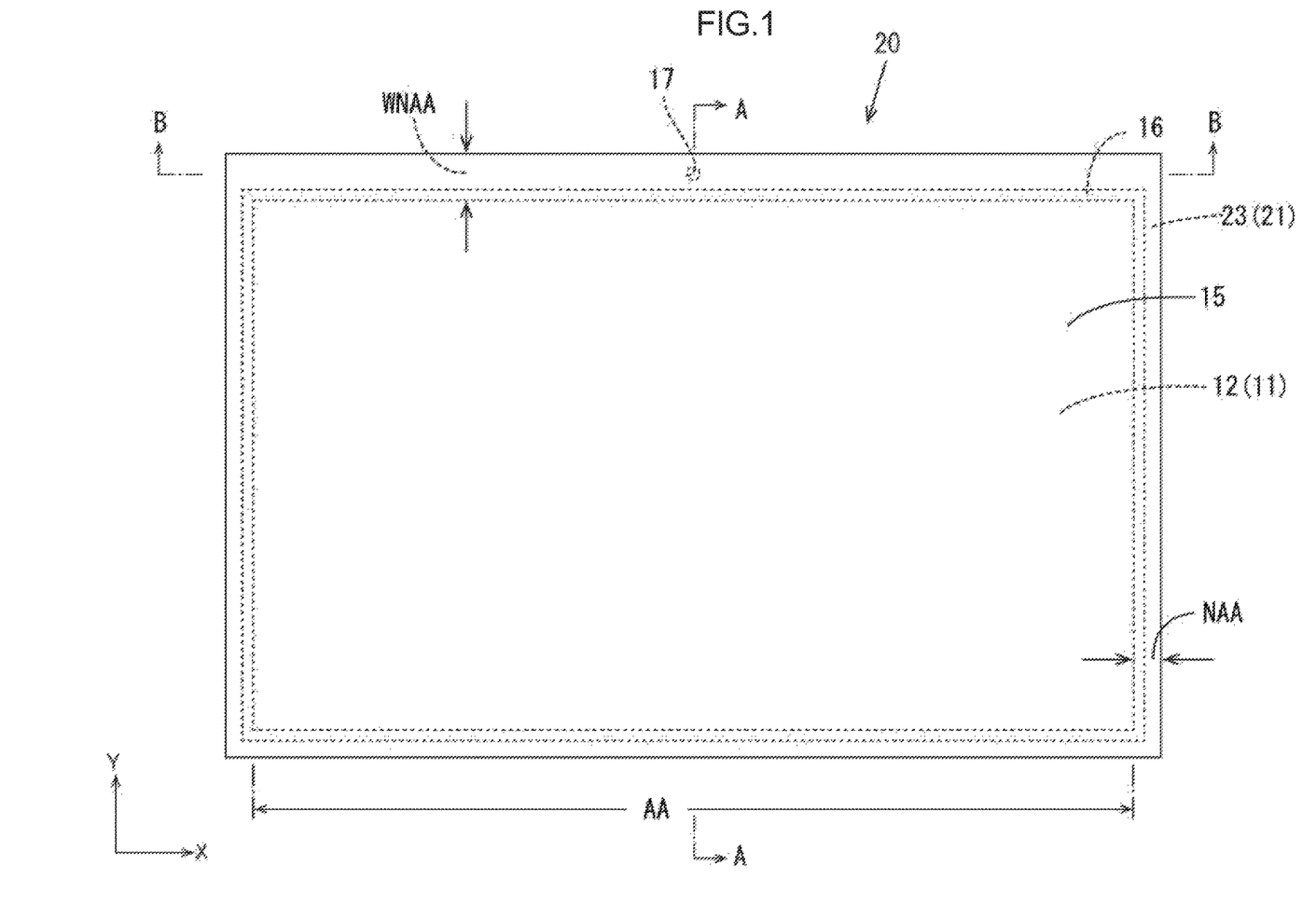
FIG. 1 is a plan view of a cover according to one embodiment.
Figure 2:
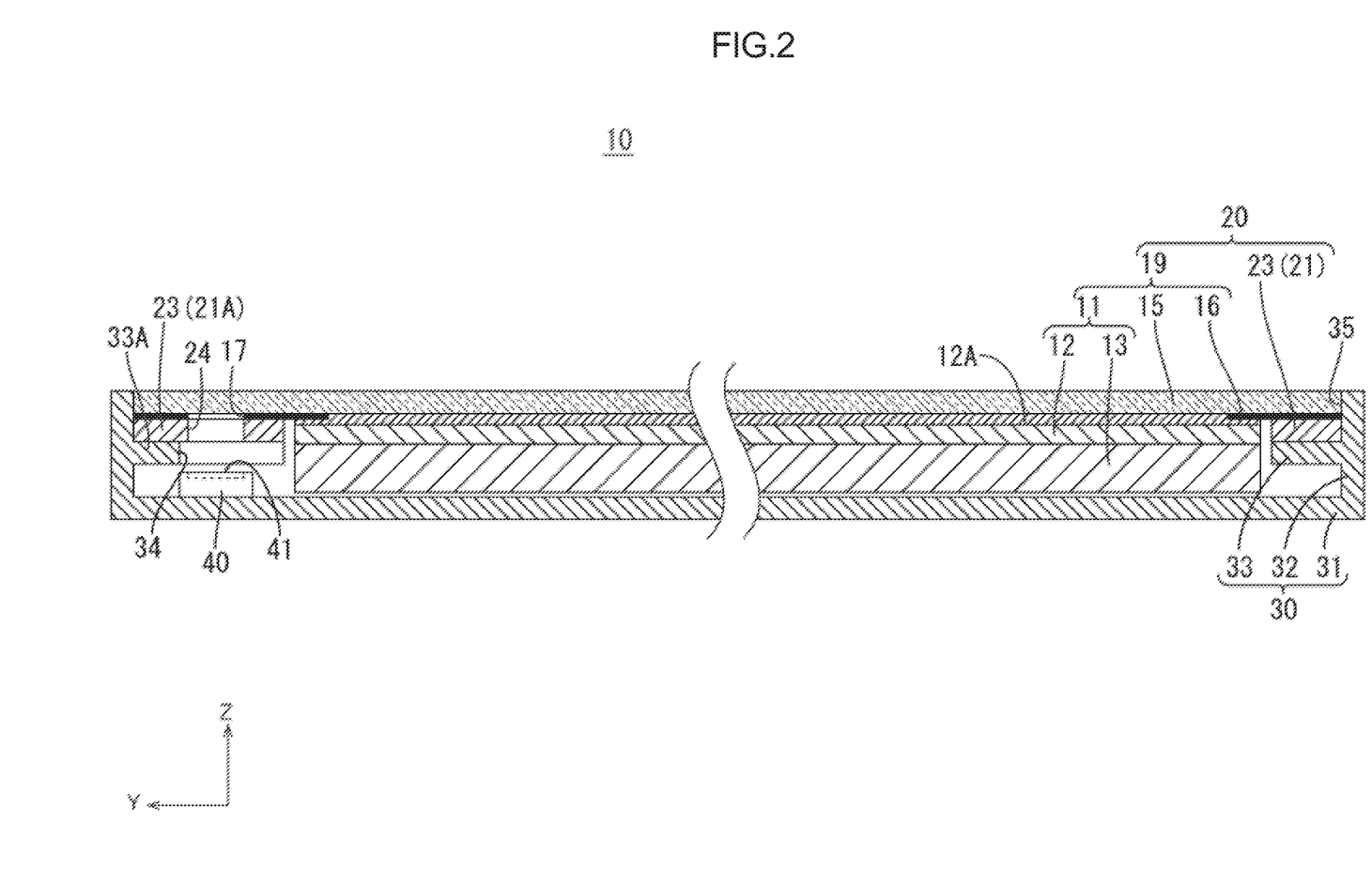
FIG. 2 is a cross-sectional view of a liquid crystal display device taken along A-A line in FIG. 1.

As is obvious from FIG. 1 illustrating a plan view of the cover 20 used in the liquid crystal display device 10 according to the present embodiment and FIG. 2 illustrating a cross-sectional view of the liquid crystal display device 10, the liquid crystal display device 10 has a flat block shape having a laterally-long rectangular plan view overall shape. The liquid crystal display device 10 includes a liquid crystal module 11 that integrally includes a liquid crystal panel 12 and a backlight unit 13. The liquid crystal panel 12 has a front side plate surface as a display surface 12A that can display images thereon. The backlight unit 13 is arranged on a back side (a rear surface side) with respect to the liquid crystal panel 12 and supplies light to the liquid crystal panel 12 for displaying. The liquid crystal display device 10 is arranged in a cabinet 30 (one example of a casing). The cabinet 30 is slightly greater than the liquid crystal module 11 and includes an opening 35 that is open on a display surface 12A side of the liquid crystal module 11. The opening 35 is closed by a cover glass 15.

The liquid crystal display device 10 according to the present embodiment is used in various kinds of electronic devices such as laptop computers (including tablet-type laptop computers), information terminals such as wearable terminals (including a smartwatch), and gaming devices.

Components included in the liquid crystal display device 10 will be described. The liquid crystal panel 12 has a laterally-long rectangular plan view shape and has a known configuration. The liquid crystal panel 12 includes a pair of glass substrates and a liquid crystal layer sealed between the substrates. The liquid crystal layer includes liquid crystal molecules that are a substance whose optical characteristics are changed according to application of an electric field. The liquid crystal panel 12 can display images with using light supplied by the backlight unit 13 and has a front surface as the display surface 12A. The liquid crystal panel 12 has a long-side direction and a short-side direction corresponding to the X-axis direction and the Y-axis direction, respectively, and a thickness direction corresponds to the Z-axis direction.

The backlight unit 13 has a substantially flat block shape having a laterally-long rectangular plan view overall shape similar to that of the liquid crystal panel 12. The backlight unit 13 at least includes a light source (for example, cold cathode tubes, LEDs, organic ELs) and an optical member. The optical member has a function of converting the light emitted by the light source into a planar light. A front side of the backlight unit 13 corresponds to a light exit side.

The liquid crystal panel 12 and the backlight unit 13 are bonded to each other with a fixing tape and configured as a module. Hereinafter, the configuration including the liquid crystal panel 12 and the backlight unit 13 as a module is referred to as the liquid crystal module 11.

The cover glass 15 is disposed to cover an entire area of the display surface 12A of the liquid crystal panel 12 to protect the liquid crystal panel 12. The cover glass 15 provides front surface side outer appearance. The cover glass 15 has a rectangular plan view shape that is greater than that of the liquid crystal panel 12. The cover glass 15 is a plate substrate made of glass that is substantially transparent and highly light transmissive. The cover glass 15 is preferably made of tempered glass. Chemical tempered glass is preferably used as tempered glass for the cover glass 15. A glass plate substrate is processed by a chemical tempering treatment to provide a chemical tempered layer on the surface of the glass plate substrate and the chemical tempered glass including the chemical tempered layer on a surface thereof is obtained. Thus, the cover glass 15 has high mechanical strength and good shock resistance properties. The liquid crystal panel 12 that is disposed on a back side of the cover glass 15 is less likely to be broken or damaged.

As illustrated in FIG. 2, a light blocking layer 16 that blocks light is disposed on a portion of a surface (a back surface) of the cover glass 15 that is opposite the liquid crystal panel 12. As illustrated in FIG. 1, the light blocking layer 16 has a frame shape having a width from an outer edge of the cover glass 15 to an inner side. The liquid crystal panel 12 has an area inside the light blocking layer 16 as a display area (AA) that displays an image. Namely, the light blocking layer 16 is disposed in an area corresponding to a non-display area that displays no images.

The liquid crystal module 11 integrally including the liquid crystal panel 12 and the backlight unit 13 is bonded to the cover glass 15 with an adhesive having light transmissivity. An entire area of the display surface 12A of the liquid crystal panel 12 is bonded to the cover glass 15 with the adhesive such that the liquid crystal module 11 and the cover glass 15 are integrally included. Thus, the liquid crystal module 11 and the cover glass 15 that are integrally included are referred to as a glass module 19.

The cabinet 30 is made of synthetic resin and has a rectangular plan view shape that is slightly greater than that of the liquid crystal module 11. The cabinet 30 has a substantially box shape having the opening 35 opening toward the front side (the display surface 12A side of the liquid crystal panel 12) (refer FIGS. 2 and 3). In detail, the cabinet 30 includes a rectangular bottom member 31, four side walls 32 extending from side edges of the bottom member 31 toward the front side, and fixing members 33 projecting from the side walls inward so as to have a rib shape.

Figure 3:
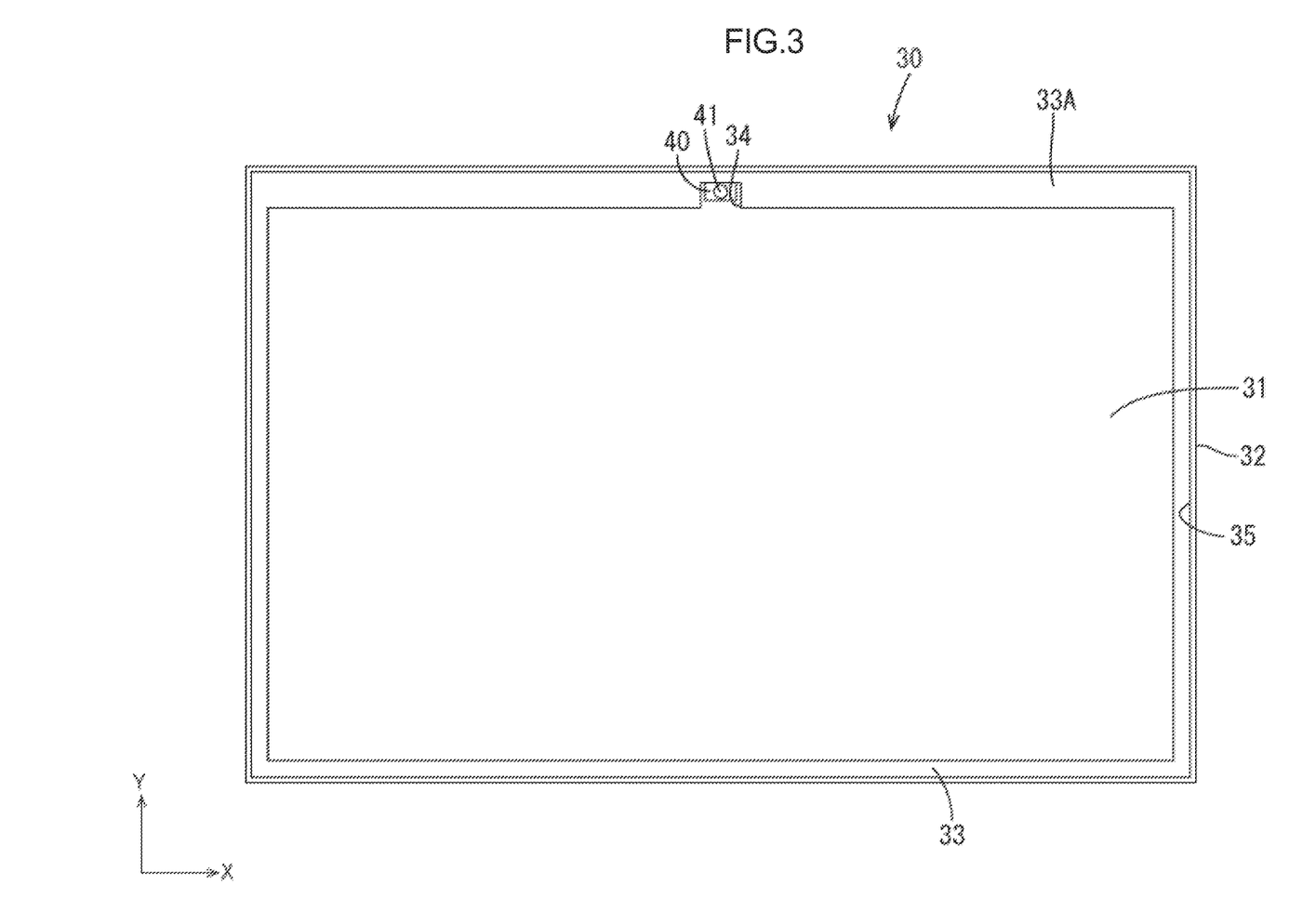
FIG. 3 is a plan view illustrating a cabinet including a camera module.

The bottom member 31 has an inner surface having a plan view shape and a plan view size that are same as or slightly greater than those of the cover glass 15. A height dimension from the upper surface of the bottom member 31 to the upper surface of the side wall 32 is slightly greater than a height dimension of the glass module 19. According to such a configuration, the cover glass 15 is fit in the opening 35 without having a space and the cabinet 30 is closed with the cover glass 15 and the liquid crystal module 11 is arranged in the cabinet 30. The bottom member 31 has a long-side direction and a short-side direction that correspond to the X-axis direction and the Y-axis direction, respectively.

The side walls 32 are disposed to surround the glass module 19 and have a rectangular frame shape as a whole. The side walls 32 include the fixing members 33 that project from the side walls 32 inwardly to be in a rib shape such that the fixing members 33 support the outer edge portion of the cover glass 15 that is fit inside the side walls 32. An adhesive layer 23 of a double-sided adhesive tape 21, which will be described later, adheres to portions of the cover glass 15 that overlap the respective fixing members 33 such that the cover glass 15 is bonded to the fixing members 33. The adhesive layer 23 is disposed to cover a substantially entire area of each of the portions of the cover glass 15 overlapping the fixing members 33.

Among the four fixing members 33 included in the respective side walls 32, the fixing member 33 that extends from one long-side (an upper long side in FIG. 3) of the cabinet 30 is a wide fixing member 33A. The wide fixing member 33A has a projection dimension from the side wall 32 that is greater than that of the fixing members 33 extending from other sides. The light blocking layer 16 disposed on the cover glass 15 has a portion overlapping the wide fixing member 33A and the portion is wider than other portions to cover a whole wide fixing member 33A and corresponds to a wide light blocking area WNAA illustrated in FIG. 1. The wide fixing member 33A includes a notch 34 that is recessed from the inside to the outside at a middle portion thereof with respect to the extending direction thereof (the X-axis direction).

As illustrated in FIGS. 2 and 3, the liquid crystal display device 10 according to the present embodiment includes a camera module 40 including an imaging element such as a charge coupled device (CCD) or a complementary metal oxide semiconductor (CMOS) as an imaging section. An image imaged by the camera module 40 can be displayed on the liquid crystal panel 12. The camera module 40 is arranged on a portion of the bottom member 31 of the cabinet 30 corresponding to the notch 34 of the wide fixing member 33A in a plan view such that an imaging surface 41 thereof faces the cover glass 15.

The adhesive layer 23 for fixing the glass module 19 (the cover glass 15) to the fixing members 33 of the cabinet 30 includes a hole 24 in a portion corresponding to the imaging surface 41 of the camera module 40. The hole 24 is a circular hole and extends through the adhesive layer 23 in the thickness direction thereof. The light blocking layer 16 includes a light blocking layer side hole 17 in a portion thereof corresponding to the imaging surface 41 of the camera module 40. The light blocking layer side hole 17 is a circular hole and no light blocking layer 16 is disposed therein. In other words, the light blocking layer side hole 17 extends through the light blocking layer 16 in the thickness direction thereof. The hole 24 and the light blocking layer side hole 17 overlap each other. According to such a configuration, light that has passed through the cover glass 15 passes through the holes 24, 17 of the light blocking layer 16 and the adhesive layer 23 and directly enters the camera module 40 through the imaging surface 41.

The liquid crystal display device 10 according to the present embodiment has the above configuration and a producing method thereof will be described next. The liquid crystal display device 10 in the present embodiment is produced by fixing the glass module 19 to the cabinet 30. The double-sided adhesive tape 21 (one example of a double-sided adhering member) is attached to a surface of the outer edge portion of the cover glass 15 where the liquid crystal module 11 is arranged. The adhesive layer 23 of the double-sided adhesive tape 21 is attached to the fixing member 33 such that the glass module 19 is fixed to the cabinet 40.

Hereinafter, a configuration including the glass module 19 before being fixed to the cabinet 30 and the double-sided adhesive tape 21 for fixing the glass module 19 with respect to the cabinet 30 (refer FIG. 7) is referred to as the cover 20.

The double-sided adhesive tape 21 includes four sections corresponding to the four sides of the cover glass 15. The four double-sided adhesive tapes 21 are attached to one surface side of the cover glass 15 to extend along the sides (edges) of the cover glass 15. Namely, each double-sided adhesive tape 21 has an elongated belt-like shape. The double-sided adhesive tape 21 (the adhesive layer 23) is attached to a portion of the cover glass 15 that is slightly closer to the outer edge than that where the light blocking layer 16 is disposed (refer FIG. 1). The double-sided adhesive tapes 21 on the adjacent sides of the cover glass may overlap each other or may be disposed not to overlap each other. The double-sided adhesive tapes 21 are preferably disposed along an entire periphery. The liquid crystal module 11 is previously bonded to the cover glass 15 with adhesive having light transmissivity.

Among the four double-sided adhesive tapes 21 disposed along the respective four sides, a general-purpose double-sided adhesive tape can be used for the double-sided adhesive tapes 21 to be attached to the fixing members 33 other than the wide fixing member 33A. The wide double-sided adhesive tape 21A (one example of a double-sided adhesive member) to be attached to the wide fixing member 33A is produced as described below, for example.

Figure 4:
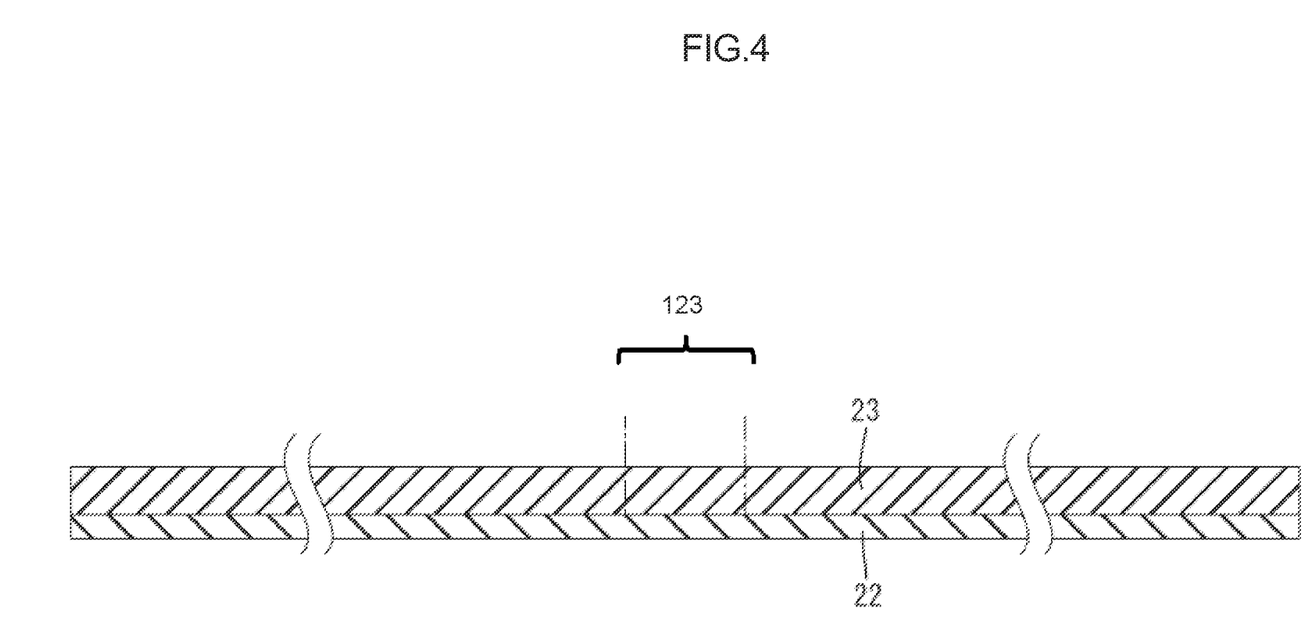
FIG. 4 is a general view illustrating a process of producing a double-sided adhesive tape (an adhesive layer forming step).
Figure 5:
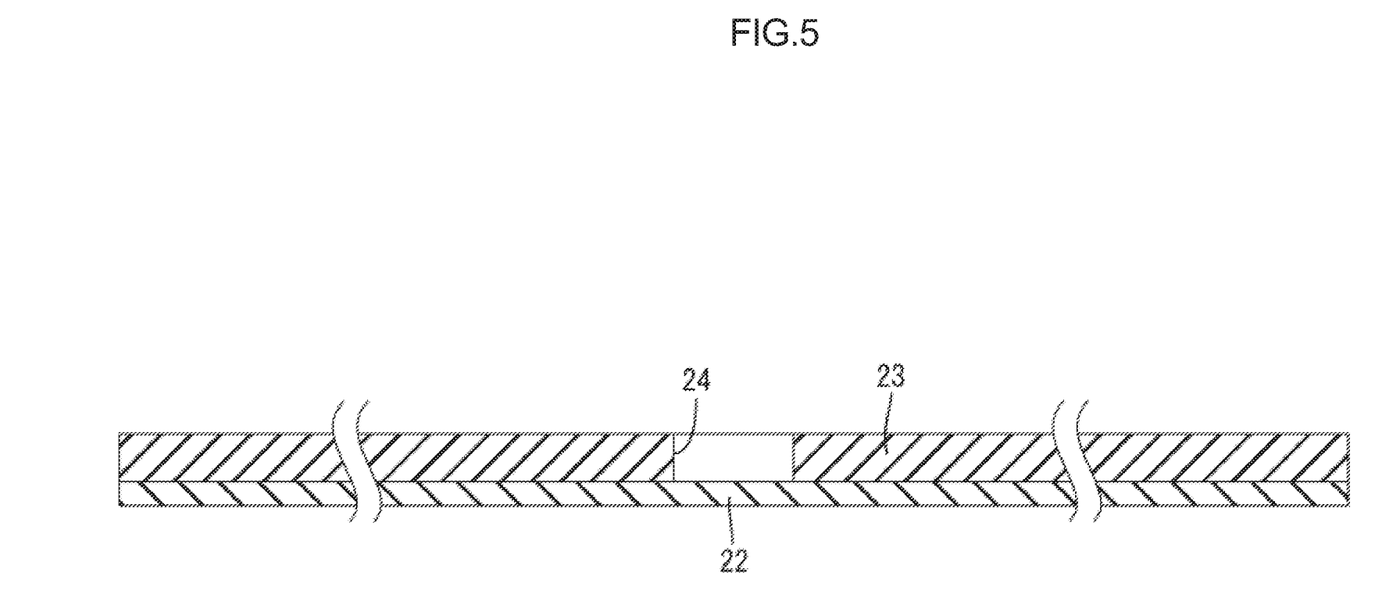
FIG. 5 is a general view illustrating a process of producing a double-sided adhesive tape (a hole forming step).
Figure 6:
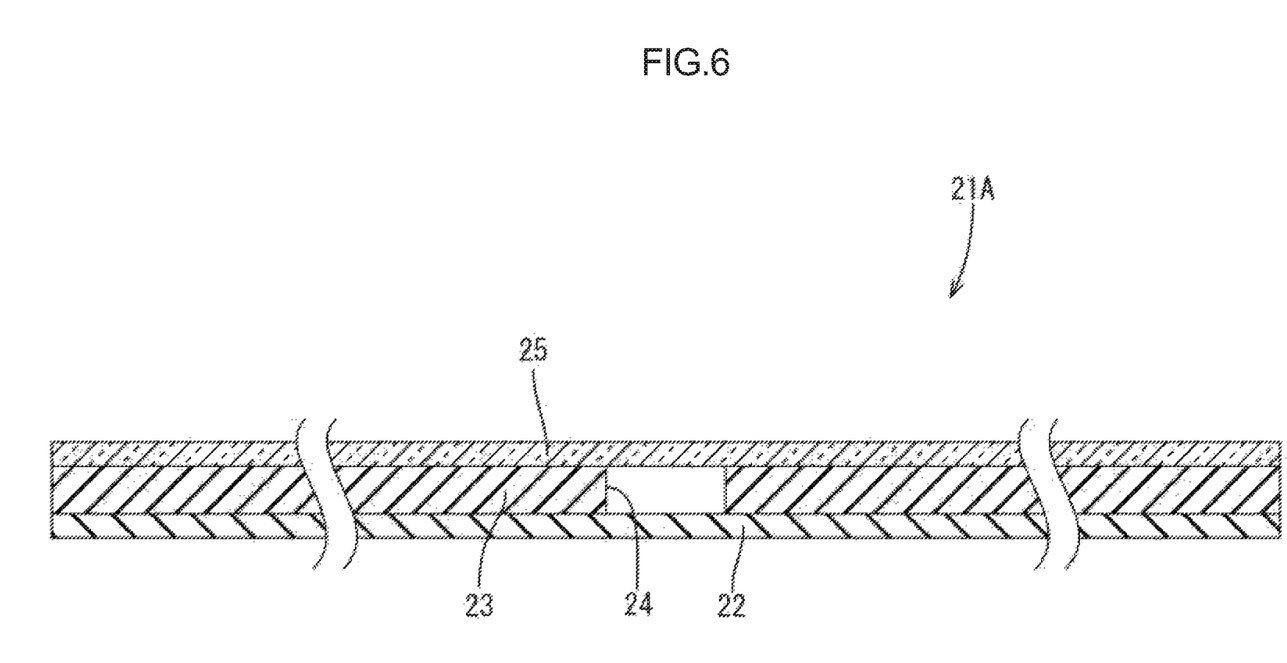
FIG. 6 is a general view illustrating a process of producing a double-sided adhesive tape (a second sheet disposing step).

First, as illustrated in FIG. 4, a first sheet 22 having releasing properties on one surface thereof and made of synthetic resin is formed in a belt-like shape having a same dimension as that of the wide fixing member 33A. Adhesive material having adhesive properties is applied evenly on the one surface of the first sheet 22 having the releasing properties to form the adhesive layer 23 (an adhesive layer forming step). Next, the first sheet 22 including the adhesive layer 23 is subjected to punching in a specific portion of the adhesive layer 23, which is defined by the dashed dotted lines 123 in FIG. 4, corresponding to the imaging surface 41 of the camera module 40 when the cover 20 is mounted on the cabinet 30. Thus, the hole 24 is formed through the adhesive layer 23 and does not extend through the first sheet 22 (refer FIG. 5, a hole forming step).

Thereafter, a second sheet 25 made of synthetic resin such as a PET film and having high transparency (high total light transmittance and low Haze) and having releasing properties on at least one surface thereof is overlaid on the adhesive layer 23 such that the surface having the releasing properties is opposite the adhesive layer 23. Thus, the adhesive layer 23 is covered with the second sheet 25 (refer FIG. 6, a second sheet disposing step). In this step, the second sheet 25 does not have a hole and the hole 24 of the adhesive layer 23 is covered with the second sheet 25. A release force required for separating the second sheet 25 from the adhesive layer 23 is set relatively higher than that of the first sheet 22. The wide double-sided adhesive tape 21A includes the hole 24 whose two openings are closed and the hole 24 has a hollow space therein. Thus, such a wide double-sided adhesive tape 21A is produced (a double-sided adhesive member producing step).

Figure 7:
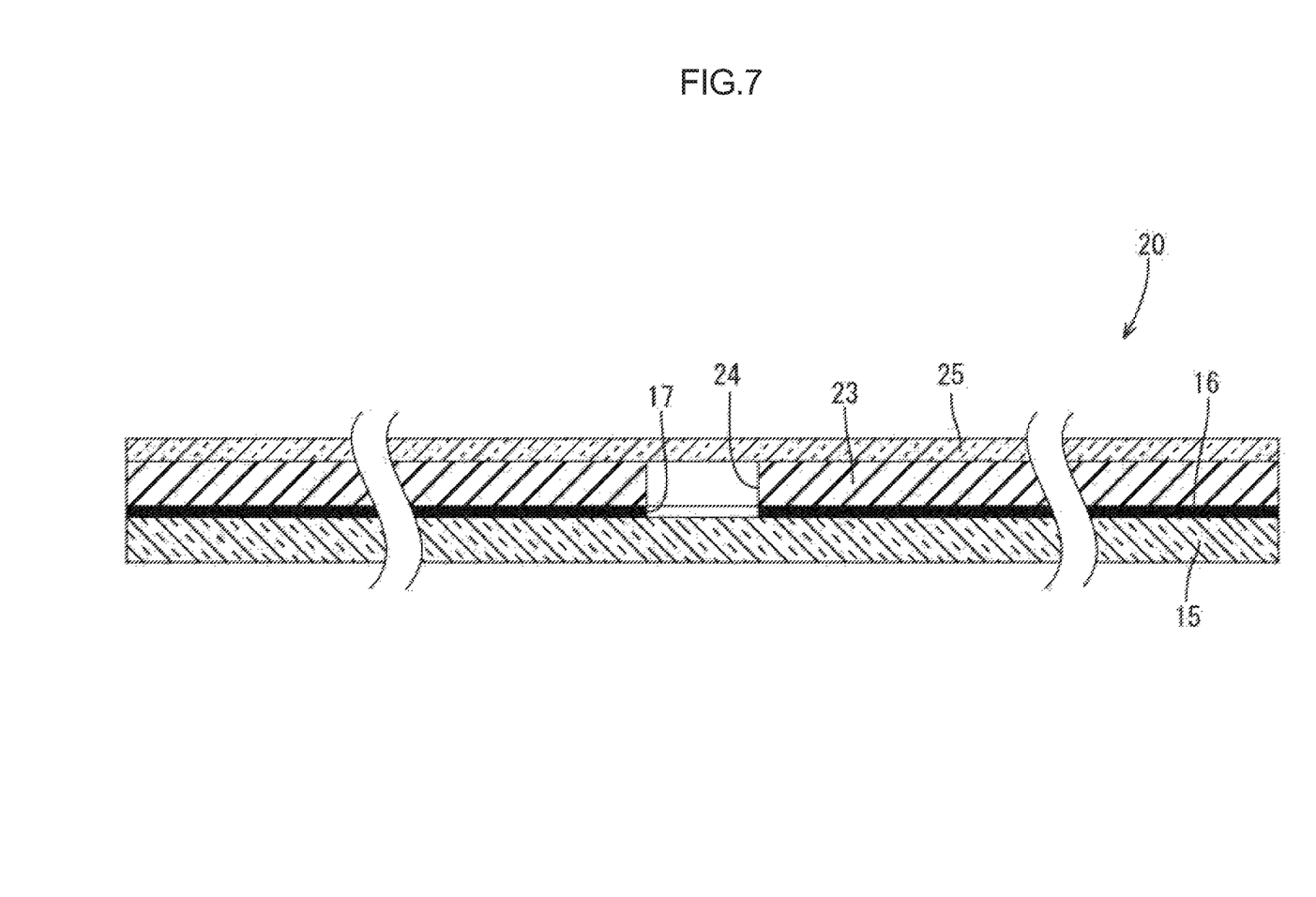
FIG. 7 is a cross-sectional view of the cover.

The cover 20 is produced with using such a wide double-sided adhesive tape 21A. First, in the wide double-sided adhesive tape 21A, the first sheet 22 having relatively low release force is separated (a separating step), and the wide double-sided adhesive tape 21A is attached to the predetermined position (the light blocking layer 16) of the cover glass 15 with the uncovered adhesive layer 2 (refer FIG. 7, an attaching step). In this step, the wide double-sided adhesive tape 21A is attached to the cover glass 15 such that the light blocking layer side hole 17 of the light blocking layer 16 overlaps the hole 24 of the adhesive layer 23 of the wide double-sided adhesive tape 21A. Similarly, the release sheet on one side surface of each general-purpose double-sided adhesive tape 21 is separated from the tape and each tape is attached to the light blocking layer 16 of the cover glass 15. Thus, the cover 20 including the double-sided adhesive tapes 21 attached on the outer periphery of the glass module 19 (the cover glass 15) is obtained. In this state, as illustrated in FIG. 7, the hole 24 of the adhesive layer 23 is covered with the second sheet 25. Namely, the two openings of the hole 24 are covered with the cover glass 15 and the second sheet 25 and the hole 24 has a closed hollow space therein. Therefore, foreign obstacles are less likely to enter the hole 24 or dirt is less likely to adhere to a surface of the hole 24 during storage or transportation of the cover 20.

Next, the liquid crystal display device 10 is produced with using the cover 20. First, the cover 20 is provisionally mounted on the cabinet 30 through the opening 35 such that the hole 24 is positioned to correspond to the imaging surface 41 of the camera module 40 (refer FIG. 8, a provisional mounting step). Then, the imaging condition of the camera module 40 is tested (a testing step).

Figure 8:
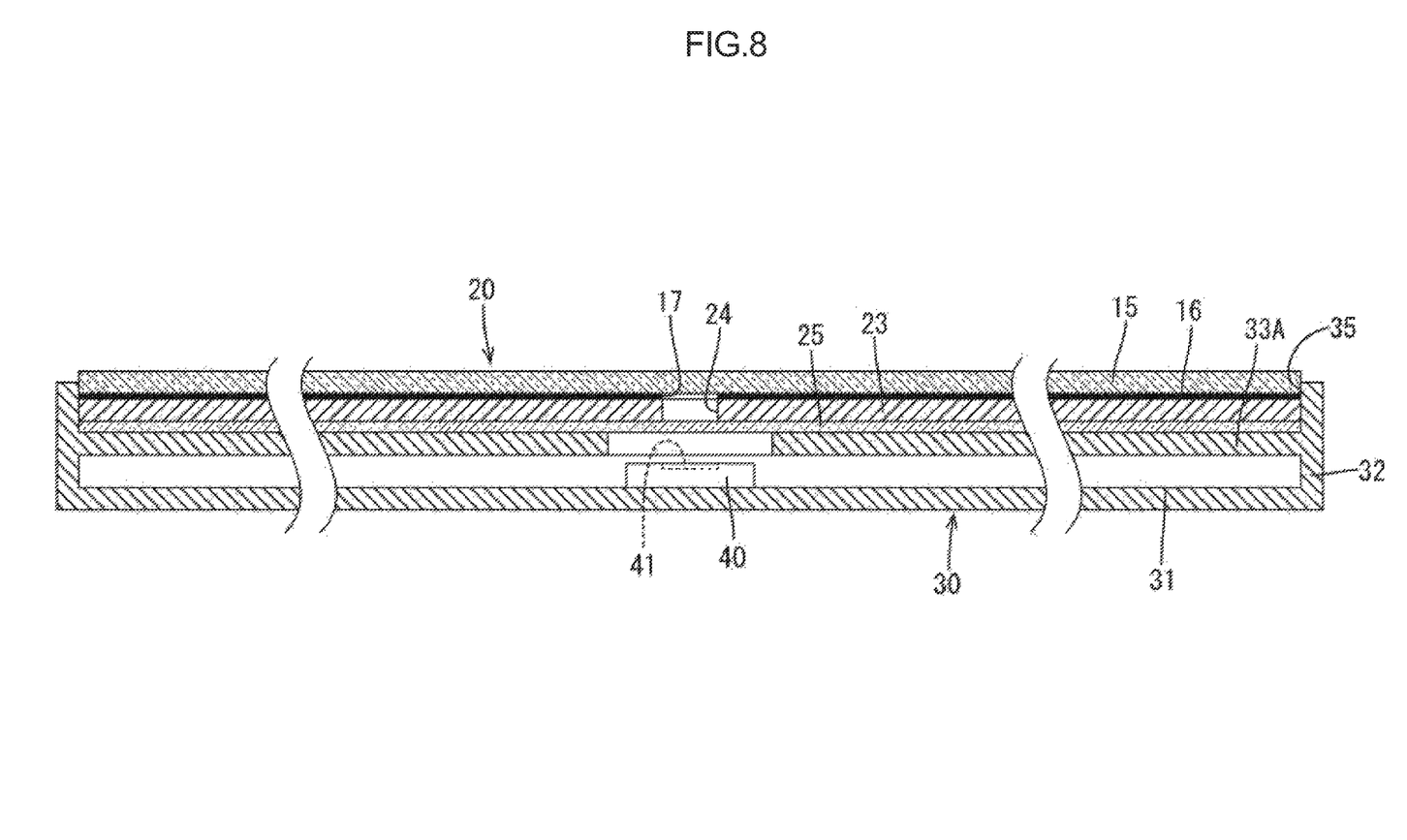
FIG. 8 is a cross-sectional view illustrating a process of producing the liquid crystal display device that is taken along B-B line in FIG. 1 (a provisional mounting step).
Figure 9:
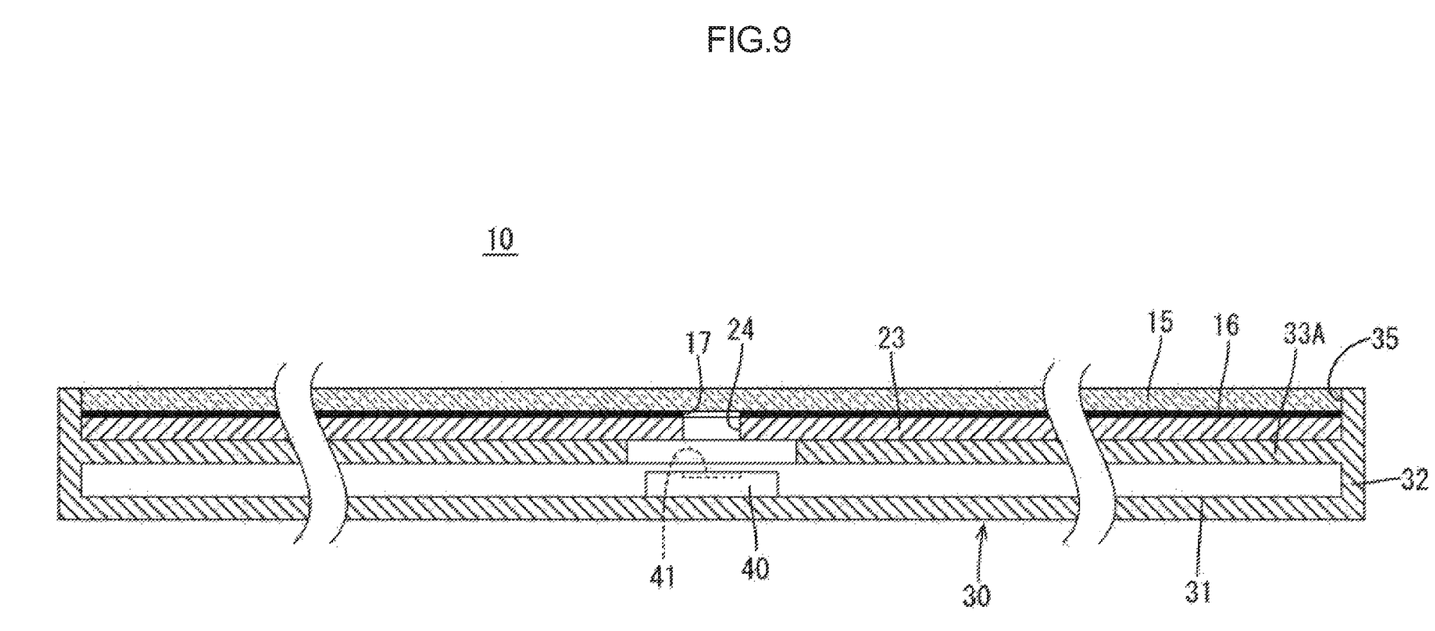
FIG. 9 is a cross-sectional view illustrating a process of producing the liquid crystal display device that is taken along B-B line in FIG. 1 (a regular mounting step).

In this step, the adhesive layer 23 is covered with the second sheet 25. In this state, the second sheet 25 has light transmissivity and the light blocking layer 16 and the adhesive layer 23 of the double-sided adhesive tape 21 include the holes 17, 24 in the positions corresponding to the imaging surface 41 of the camera module 40, respectively. Therefore, external light can enter the camera module 40 through the cover glass 15 and the second sheet 25.

If it is confirmed that the imaged image has no errors through the testing, the cover 20 is removed from the cabinet (a removing step). Then, the second sheet 25 is separated from the adhesive layer 23 and the cover is fixed to the cabinet 30 with the uncovered adhesive layer 23. The uncovered adhesive layer 23 is attached to the predetermined position (the fixing members 33) of the cabinet 30. Thus, the regular mounting is performed (refer FIG. 9, a regular mounting step). In this step, at least the regular mounting operation is preferably performed in a clean environment such as a clean room. Thus, the liquid crystal display device 10 according to the present embodiment is obtained.

If an imaging error is found in the testing step, the camera module 40 is detached from the cabinet 30 and adjusted.

Next, operations and effects of the present embodiment will be described. The cover 20 in this embodiment includes the cover glass 15 having a flat plate shape and light transmissivity, the adhesive layer 23 disposed on one surface of the outer edge portion of the cover glass 15, and the second sheet 25 disposed on the adhesive layer 23 so as to be releasable from the adhesive layer 23. The adhesive layer 23 includes the hole 24 extending through the thickness of the adhesive layer 23 and the second sheet 25 has light transmissivity and covers the hole 24.

According to such a configuration, since the hole is covered with the second sheet 25, foreign obstacles are less likely to enter the hole 24 and dirt is less likely to adhere to a surface of the hole 24 during storage or transportation of the cover 20 and in the provisional mounting of the cover 20 on the cabinet 30.

The surface of the cover glass 15 having the adhesive layer 23 includes another portion other than the portion having the adhesive layer 23. The liquid crystal module 11 for displaying an image on the cover glass 15 side is bonded to the other portion of the surface of the cover glass 15.

The adhesive layer 23 of the cover 20 is disposed to surround the liquid crystal module 11.

Further, the cover 20 includes the light blocking layer 16, which blocks light, on the outer edge portion of one surface of the cover glass 15. The adhesive layer 23 is disposed on the light blocking layer 16. The light blocking layer 16 includes the light blocking layer side hole 17 so as to overlap the hole 24 of the adhesive layer 23 and extend through the thickness of the light blocking layer 16. According to such a configuration including the light blocking layer 16, the light can pass through the cover glass 15.

The method of producing the cover 20 includes a double-sided adhesive tape producing step, a separating step, and an attaching step. The double-sided adhesive tape producing step includes the adhesive layer forming step, the hole forming step, and the second sheet disposing step that are performed sequentially to produce the double-sided adhesive tape 21. The adhesive layer forming step is for forming the adhesive layer 23 on one surface of the first sheet 22 so as to be releasable from the first sheet 22. The hole forming step is for forming the hole 24 so as to extend through the adhesive layer 23 and not to extend through the first sheet 22 in a stacking direction of the first sheet 22 and the adhesive layer 23. The second sheet disposing step is for disposing the second sheet 25 on the adhesive layer 23 so as to be releasable from the adhesive layer 23 and cover the hole 24. The second sheet 25 of the double-sided adhesive tape 21 has light transmissivity and has a relatively high release force that is required to be separated from the adhesive layer 23 compared to a release force required for the first sheet 22. The separating step is for separating the first sheet 22 having a low release force from the adhesive layer 23 in the double-sided adhesive tape 21 after the double-sided adhesive tape producing step. The attaching step is for attaching the uncovered adhesive layer 23 to the cover glass 15 that has a flat plate shape and light transmissivity.

Further, the method of producing the liquid crystal display device 10 includes the provisional mounting step, the testing step, the removing step, and the regular mounting step that are performed sequentially. The provisional mounting step is for provisionally mounting the cover 20 on the cabinet 30 through the opening 35 such that the hole 24 overlaps the camera module 40. The cabinet 30 includes the camera module 40 for imaging a subject and has the opening 35 opening toward the imaging surface 41 of the camera module 40. The testing step is for testing an imaging condition of the camera module 40. The removing step is for removing the cover 20 from the cabinet 30. The regular mounting step is for separating the second sheet 25 from the adhesive layer 23 and fixing the cover 20 including the uncovered adhesive layer 23 to the fixing member 33 of the cabinet 30.

According to the method of producing the cover 20 and the method of producing the liquid crystal display device 10, foreign obstacles are less likely to enter the hole 24 of the adhesive layer 23 and dirt is less likely to adhere to a surface of the hole 24 during transportation or the provisional mounting.

Other Embodiments

The present technology is not limited to the embodiments described in the above descriptions and drawings. The following embodiments may be included in the technical scope.

(1) In the above embodiment, the PET film having high transparency (high total light transmittance and low Haze) is used as the second sheet 25 (the release sheet); however, such a sheet may not be used in view of a cost. A simple testing is performed for testing the camera module with the provisionally mounted cover and the camera module is tested for basic errors. The regular mounting is performed for only the objects that passed the simple testing and defective objects are eliminated.

(2) The cover panel is not necessarily made of glass but may be made of material that has refractive index sufficiently higher than that of air and high light transmissivity, for example, transparent resin such as acrylic or polycarbonate.

(3) In the above embodiment, the second sheet 25 has light transmissivity and a release force greater than that of the first sheet 22. However, the first sheet 22 may have light transmissivity and a release force greater than that of the second sheet 25.

(4) In the above embodiment, the liquid crystal module 11 is previously attached to the cover glass 15 before the double-sided adhesive tape 21 is attached to the cover glass 15. However, the liquid crystal module 11 may be attached to the cover glass 15 after the attachment of the double-sided adhesive tape 21. In such a configuration, the cover includes a cover panel and a double-sided adhesive tape attached thereto.

(5) The imaging device is not necessarily the liquid crystal display device but may be any electronic devices including the imaging function.

The invention claimed is:

1. A cover comprising: a cover panel having a flat plate shape and light transmissivity; an adhesive layer disposed on at least a portion of one surface of the cover panel; and
in a testing state, a release sheet disposed on the adhesive tape so as to be releasable from the adhesive layer, wherein the adhesive layer includes a hole extending through the adhesive layer in a thickness direction thereof, and the release sheet has light transmissivity and covers the hole; and
the one surface of the cover panel includes a portion other than the at least one portion having the adhesive layer, and a display module for displaying an image toward the cover panel side is attached to a part of the portion other than the at least one portion having the adhesive layer; and a light blocking layer that blocks light and is disposed on an outer edge portion of the one surface of the cover panel, wherein the adhesive layer is disposed on the light blocking layer, and the light blocking layer includes a light blocking layer side hole in a portion thereof overlapping the hole and the light blocking layer side hole extends through the light blocking layer in a thickness direction thereof; in a regular mounting state, the release sheet is released and the cover is configured to seal with a cabinet by the adhesive layer.

2. The cover according to claim 1, wherein the adhesive layer is disposed to surround the display module.

* * * * *